W. & C. R. FENSTERMACHER.
Side-Bar Wagon.
No. 217,734.   Patented July 22, 1879.
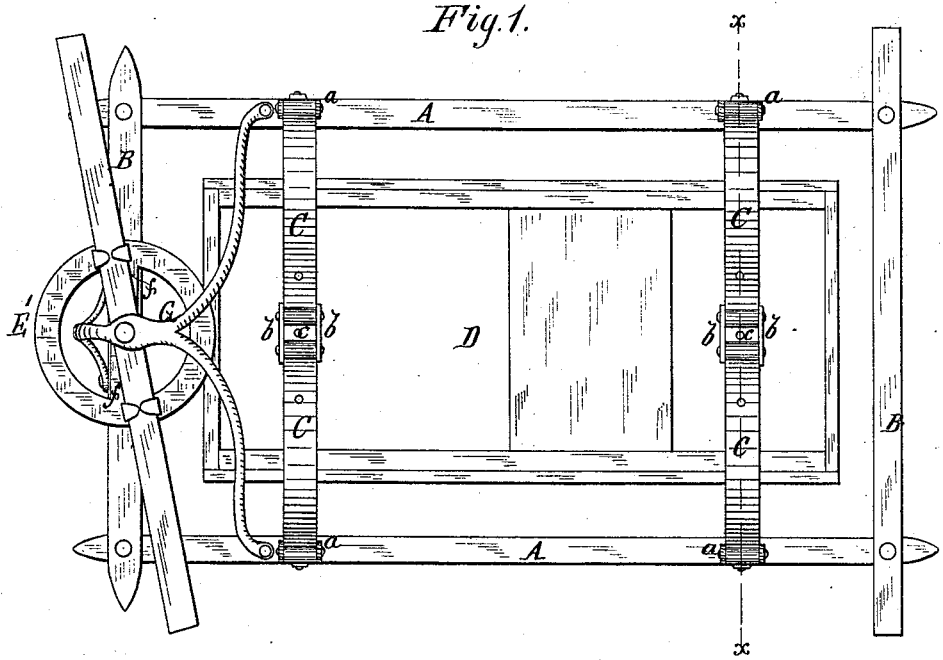
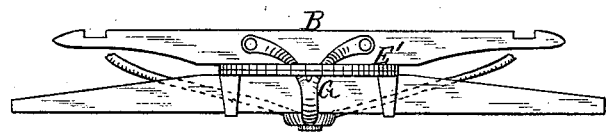
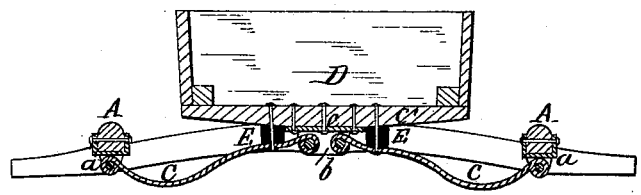
WITNESSES:
Henry N. Miller
C. Sedgwick
INVENTOR:
W. Fenstermacher
C. R. Fenstermacher
BY Munn & Co.
ATTORNEYS.

UNITED STATES PATENT OFFICE.

WILLIAM FENSTERMACHER AND CYRUS R. FENSTERMACHER, OF SHIPPENSBURG, PENNSYLVANIA.

IMPROVEMENT IN SIDE-BAR WAGONS.

Specification forming part of Letters Patent No. 217,734, dated July 22, 1879; application filed May 22, 1879.

*To all whom it may concern:*

Be it known that we, WILLIAM FENSTERMACHER and CYRUS R. FENSTERMACHER, of Shippensburg, in the county of Cumberland and State of Pennsylvania, have invented a new and Improved Side-Bar Wagon, of which the following is a specification.

The invention consists in combining with the king-bolt and fifth-wheel a stay or brace having rear branches secured to side bars passing up on the inside of fifth-wheel, and having the front branches fastened to the bolster, as hereinafter described.

In the accompanying drawings, Figure 1 is a bottom plan of a side-bar wagon provided with our improvements. Fig. 2 is a cross-section of the same on line $x\,x$ of Fig. 1; and Fig. 3 is a view of the front axle, showing the improved fifth-wheel.

Similar letters of reference indicate corresponding parts.

Referring to the drawings, A A are the side bars, joined together at the ends by bolsters B B. C C are steel springs, in the form of irregular ogee curves. The outer ends of these steel springs are coupled to the under side of the side bars by clips $a\,a$, with a pivoted connection, so that the springs can turn on the same. The inner ends are pivoted between jaws $b\,b$, depending from the plate $c$, bolted to the bar $c'$, on which the wagon-body D rests, at the middle of its width, whereby the body is firmly connected with the springs.

E are the rubber cushions interposed between the bar $c'$ and steel springs on either side of the plate $c$, and secured in place by vertical bolts passed up through the springs, cushions, and the bar $c'$, thus securing all three together. Thus the body is supported on either side of its connection with the steel springs by the rubber cushions, which keep it from contact with the springs, whatever the amount of jolting to which it may be subjected. At the same time all the advantages attendant upon the use of steel springs are retained without the objections to their use heretofore experienced.

E' is the fifth-wheel, having a transverse plate, $f$, across its diameter. This plate is fastened to the front bolster, and the king-bolt passes up through it.

Making the fifth-wheel and plate $f$ in one piece greatly strengthens the connection between the wheel and axle, and reduces the great strain on the bolt when the axle is turned to one side in getting in and out of the wagon.

G is a brace or stay, having two extensions reaching to the side bar. It is passed under the axle, so that the king-bolt passes through it and reaches up inside the fifth-wheel, and is thence carried up and bolted to the front of the bolster or cross-bar B, as shown. This gives great strength to the connection between the front axle and the body, and in case of the breaking of the king-bolt it prevents the uncoupling of the front axle and the body.

Having thus described our invention, we claim as new and desire to secure by Letters Patent—

The stay or brace G, receiving the king-bolt, and having rear branches secured to side bars, A, passing up on the inside of the fifth-wheel, and having its front branches fastened to the bolster, as shown and described.

WM. FENSTERMACHER.
CYRUS R. FENSTERMACHER.

Witnesses:
JOHN E. ANGLE,
GEO. T. TUNSTAN.